United States Patent
Kuroda et al.

(10) Patent No.: US 6,883,219 B2
(45) Date of Patent: Apr. 26, 2005

(54) METHOD FOR MANUFACTURING SENSOR DEVICE

(75) Inventors: Michitake Kuroda, Ama-gun (JP); Kiyoshi Otsuka, Kariya (JP)

(73) Assignee: Denso Corporation, Kariya (JP)

( * ) Notice: Subject to any disclaimer, the term of this patent is extended or adjusted under 35 U.S.C. 154(b) by 33 days.

(21) Appl. No.: 10/395,070

(22) Filed: Mar. 25, 2003

(65) Prior Publication Data

US 2003/0182783 A1 Oct. 2, 2003

(30) Foreign Application Priority Data

Mar. 26, 2002 (JP) ........................................ 2002-086042

(51) Int. Cl.⁷ ............................................ G01M 19/00
(52) U.S. Cl. ....................... 29/407.07; 29/709; 29/706; 29/511; 73/756
(58) Field of Search ............................. 29/407.01, 706, 29/707, 708, 709, 235, 450, 621.1, 511; 73/756, 724, 725, 768, 855, 746, 723, 726; 361/283.1–283.4; 338/4, 42

(56) References Cited

U.S. PATENT DOCUMENTS

| | | | | |
|---|---|---|---|---|
| 4,519,254 A | * | 5/1985 | Sonderegger et al. | 73/726 |
| 4,735,091 A | * | 4/1988 | Engeler et al. | 73/756 |
| RE34,441 E | * | 11/1993 | Ruckenbauer et al. | 73/756 |
| 5,595,939 A | | 1/1997 | Otake et al. | |
| 5,827,972 A | * | 10/1998 | Balcarek et al. | 73/756 |
| 6,055,864 A | * | 5/2000 | Stiller et al. | 73/724 |

FOREIGN PATENT DOCUMENTS

JP         2000-9572        1/2000

* cited by examiner

Primary Examiner—David P. Bryant
Assistant Examiner—Stephen Kenny
(74) Attorney, Agent, or Firm—Posz & Bethards, PLC

(57) ABSTRACT

A pressure sensor includes a sensing element in a sensing chamber defined by two cases, one of which is crimped to the other. An internal pressure of the chamber is affected by a crimping force. In the manufacturing process of the pressure sensor, the internal pressure is monitored during crimping the cases. To monitor the internal pressure, the sensing element of the pressure sensor is used. An output signal of the sensing element is sent to a crimping machine. The crimping machine controls a crimping force based on the output signal.

11 Claims, 5 Drawing Sheets

METHOD FOR MANUFACTURING SENSOR DEVICE

CROSS REFERENCE TO RELATED APPLICATION

This application is based on and incorporates herein by reference Japanese Patent Application No. 2002-86042 filed on Mar. 26, 2002.

FIELD OF THE INVENTION

The present invention relates to a method for manufacturing a sensor device having a sensing portion in a sensing chamber defined by cases, one of which is crimped to the other, especially the sensor device which pressure in the chamber is affected by the a crimping force.

BACKGROUND OF THE INVENTION

A pressure sensor device disclosed in JP-A-7-243926 is shown in FIG. 6. A connector case 3 (a first case) and a housing 7 (a second case) are fixed together, and a sensing chamber 10 that has a predetermined internal pressure is defined by the case 3 and the housing 7. More specifically, a well 30 provided in the case 3 is partitioned by a metal diaphragm 8 that is welded to the housing 7 and a closed space is formed as the chamber 10. The chamber 10 contains oil 11, which is a pressure transmission medium. A pressure of the oil 11 is maintained at a predetermined level.

A sensing element 1, which is a sensing portion of the pressure sensor device, is provided in the chamber 10 and fixed to the well 30 to sense the oil pressure. The sensing element 1 is electrically connected to connector pins 4 arranged in the connector case 3 via wires 6.

In such a pressure sensor device, a measuring pressure is applied to the metal diaphragm 8 via a pressure application hole 72, and the oil pressure in the chamber 10 varies. An output signal corresponding to the variation in the oil pressure is outputted from the sensing element 1 via the connector pins 4.

The case 3 is fitted to an open-end of the housing 7, a rim 75 of which is in a straight shape as shown in chain double dashed-line in FIG. 6. While fitting the case 3 to the housing 7, the sensing element 1 and a predetermined volume of the oil 11 are held in the well 30. Then, a predetermined amount of force is applied to the rim 75 so that the housing 7 is crimped to the case 3. A closed space, which is the chamber 10, is defined.

The oil pressure in the chamber 10 after the housing 7 is crimped to the case 3 varies according to a cubic capacity of the chamber 10. The cubic capacity of the chamber 10 varies according to a size of the well 30, a shape of the metal diaphragm 8 after the welding, the volume of the oil 11, and other factors. Since the sensor element 1 senses the oil pressure in the chamber 10, the output of the sensor element 1 may be off a target level. This reduces a sensitivity of the sensor device, resulting in a problem not only for pressure sensors but also for sensors which sensitivity is affected by a force applied to cases for crimping.

SUMMARY OF THE INVENTION

The present invention therefore has an objective to provide a method for manufacturing a sensor device having a sensing portion in a sensing chamber defined by cases, one of which is crimped to the other, especially the sensor device which pressure while maintaining the internal pressure of the chamber at a target level.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
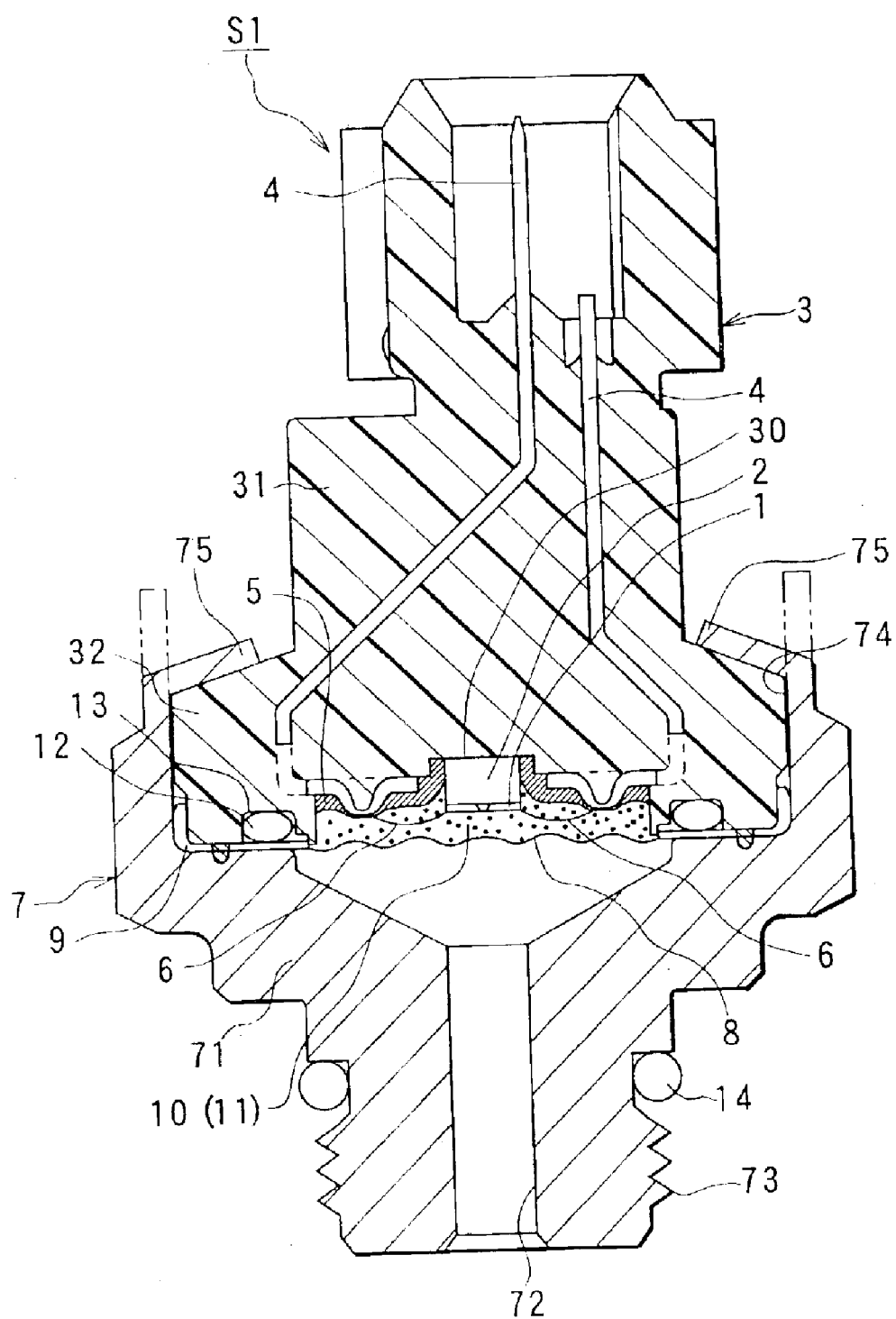
FIG. 1 is a cross-sectional view of a pressure sensor according to the first embodiment of the present invention.

The preferred embodiment of the present invention will be explained with reference to the accompanying drawings. In the drawings, the same numerals are used for the same components and devices.

[Embodiment]

A pressure sensor S1 shown in FIG. 1 is used for a vehicle to detect a pressure of an air-conditioner coolant or a fuel pressure. A sensing element 1 that is a sensing portion of the sensor device Si is provided for pressure sensing. The sensing element 1 is fixed to a glass base 2 via anodic bonding. The glass base 2 is arranged in a well 30 formed in a connector case 3 (first case) and fixed to the case 3 with adhesive, such as silicon rubber. A semiconductor diaphragm-type sensing element is used for the sensing element 1 that converts a level of pressure into an electrical signal.

The case 3 is made of a resin, such as polyphenylene sulfide (PPS), formed by a die. Connector pins 4 are integrated in the case 3 by insert molding and used for an electrical signal output. The case 3 has a connecting portion 3a for electrically connecting first ends of the connector pins 4 to an external circuit (not shown) for a vehicle via an external wiring member (not shown). The external circuit and the external wiring member include an electrical control unit (ECU) and a wire harness, respectively. Second ends of the connector pins 4 are sealed to the case 3 in the well 30 with an interfacial sealing adhesive, such as silicon rubber.

In the well 30, the sensing element 1 is electrically connected to the second ends of the connector pins 4 via bonding wires 6. An electrical signal outputted from the sensing element 1 is transmitted to the external circuit via the bonding wires 6 and the connector pins 4.

A housing 7 (second case) has a body 71 made of plated carbon steel. The body 7 has a pressure application hole 72 through which a measuring pressure is applied and a screw portion 73 for fixing the device 1 to an appropriate place. Furthermore, a metal diaphragm 8 and a holding member 9 (weld ring) are welded and airtightly connected to the circumference of the body 71 around one end of the hole 72 adjacent to the case 3. The metal diaphragm 8 is made of thin metal such as steel use stainless (SUS).

A body 31 of the case 3 is in a substantially pole-shape and includes the sensing element 1 and the connector pines 4. The body 31 has a protruding portion 32 that is located on an entire periphery of the body 31. The body 71 of the housing 7 has an opening 74 on the side connecting to the body 31 of the case 3. When the case 3 and the housing 7 are assembled, the protruding portion 32 of the case 3 is fitted in the opening 74, and aligned with a rim 75 provided around the opening 74. Then, the rim 75 is bent so that its inner surface is pressed against an outer surface of the protruding portion 32 for crimping.

After the housing 7 is crimped to the case 3, the sensing chamber 10 that is defined by the well 30 and the metal diaphragm 8. The oil 11, which is not only a pressure transmission medium but also filling liquid, is provided in the chamber 10. Oil that has a small coefficient of thermal expansion or contraction is used for the oil 11.

An O-ring 12 is arranged in a groove 13 provided around the chamber 10 in the case 3 for air sealing. The groove 13 is formed in a shape corresponding to the O-ring 12. The O-ring 12 is inserted in the groove 13 and pressed down between the case 3 and a holding member 9 of the housing 7.

In the chamber 10, the oil pressure is at a predetermined level. The oil pressure in the chamber 10 is detected by the sensing element 1. The pressure sensor S1 is fixed to an appropriate portion in a coolant duct of an air-conditioner so that it connects to the coolant duct with the screw portion 73 and an O-ring 14. The O-ring 14 is provided around the screw portion 73. A measuring pressure in the coolant duct is applied to the pressure sensor S1 via the pressure application hole 72.

The pressure is applied to the metal diaphragm 8 and transmitted to the sensing element 1 via the oil 11 in the chamber 10. The sensing element 1 converts the pressure level to an electrical signal (output voltage). The output signal is transmitted to the external circuit via the bonding wires 6 and connector pins 4. Therefore, the air-conditioner coolant pressure level is detected.

In the manufacturing process of the pressure sensor S1, the connector case 3, in which the connector pins 4 are molded, is molded of thermoplastic resin, such as PPS, by a plurality of dies. The base 2, to which the sensing element 1 is fixed, is arranged in the well 30. After the sensing element 1 and the connector pins 4 are electrically connected via the bonding wires 6, the O-ring 12 is inserted in the groove 13.

The case 3 is placed so that the sensing element 1 faces up, and a certain amount of the oil 11, for instance fluoric oil, is inserted into the well 30 by a dispenser. The housing 7 with the metal diaphragm 8 and the holding member 9 welded and airtightly connected to the circumference of the body 71 is provided. At this moment, the rim 75 is in a straight shape as shown in chain double dashed-line in FIG. 1.

The housing 7 is brought down in a horizontal position to be fitted to the case 3. A unit of the housing 7 and the case 3 is brought into a vacuum room to evacuate unnecessary air from the chamber 10. Then, the case 3 and the housing 7 are pressed against each other until the holding member 9 is brought into good contact with the case 3 to form the chamber 10 sealed by the O-ring 12. After this step is completed, the unit of the housing 7 and the case 3 is taken out of the vacuum room.

A force is applied to the rim 75 so that the housing 7 is crimped to the case 3. The rim 75 is bent so that its inner surface is pressed against an outer surface of the protruding portion 32 for crimping. The crimping is performed by a crimping machine 110 shown in FIG. 2.

Figure 2:
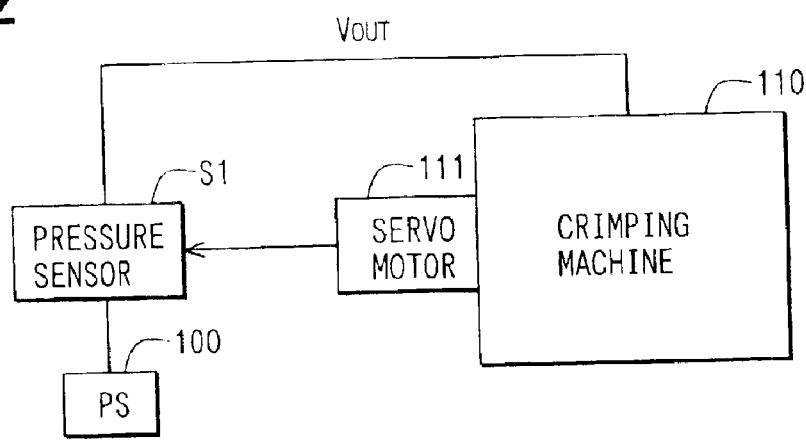
FIG. 2 is a block diagram showing devices used in a crimping process.

In the crimping process, power is supplied from a power source 100 to the pressure sensor S1 via the connector pines 4 as shown in FIG. 2. Under this condition, the sensing element 1 is ready for pressure detection. An output signal corresponding to an output voltage Vout is outputted from the sensing element 1 is and sent to the crimping machine 110 as a feed-back signal. In the crimping machine, a crimping force is adjusted by controlling a crimping oil pressure by a servomotor 111. The servomotor 111 is controlled based on the feed-back signal.

Figure 3:
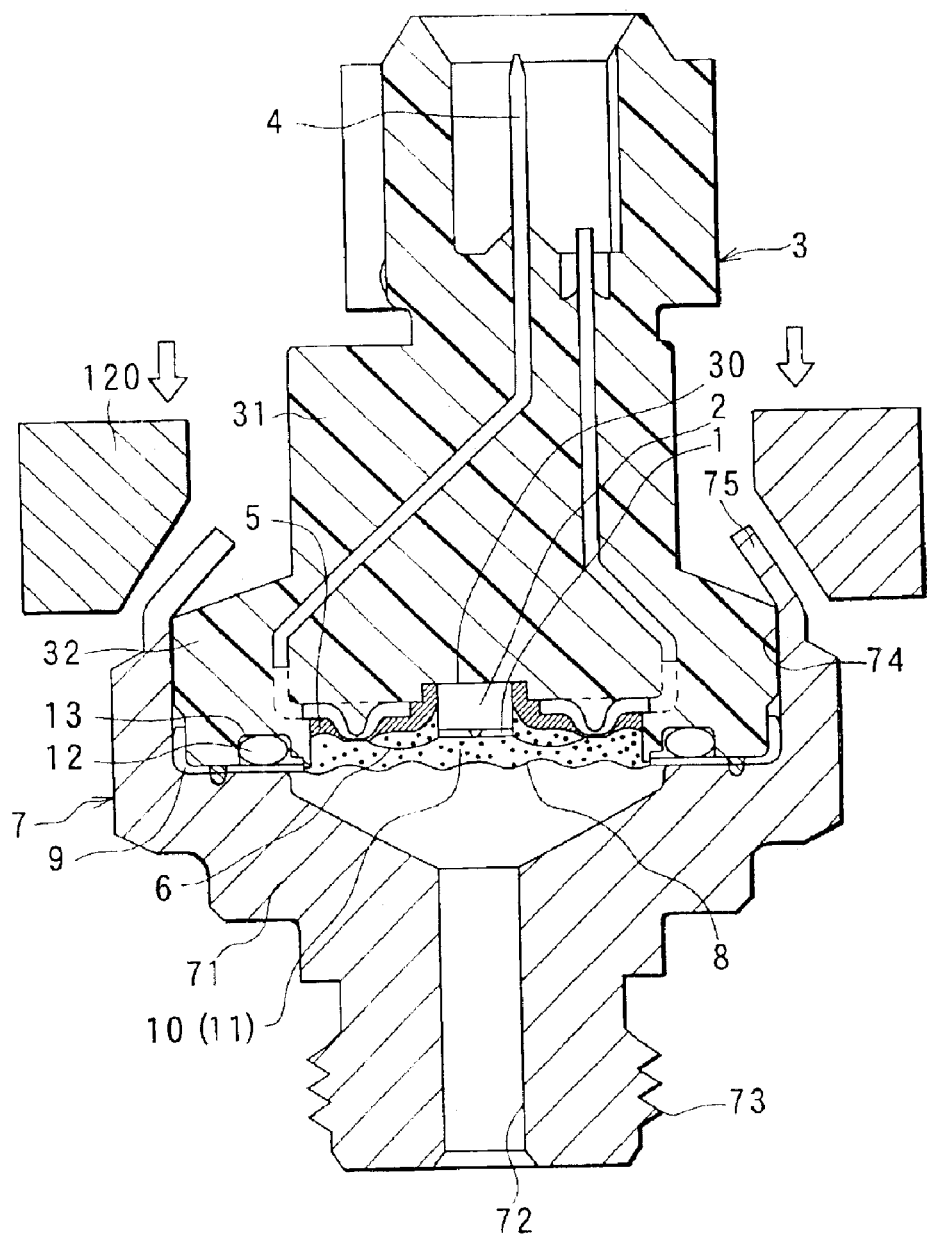
FIG. 3 is a cross-sectional view of the pressure sensor in the first stage of a crimping process according to the first embodiment.
Figure 4:
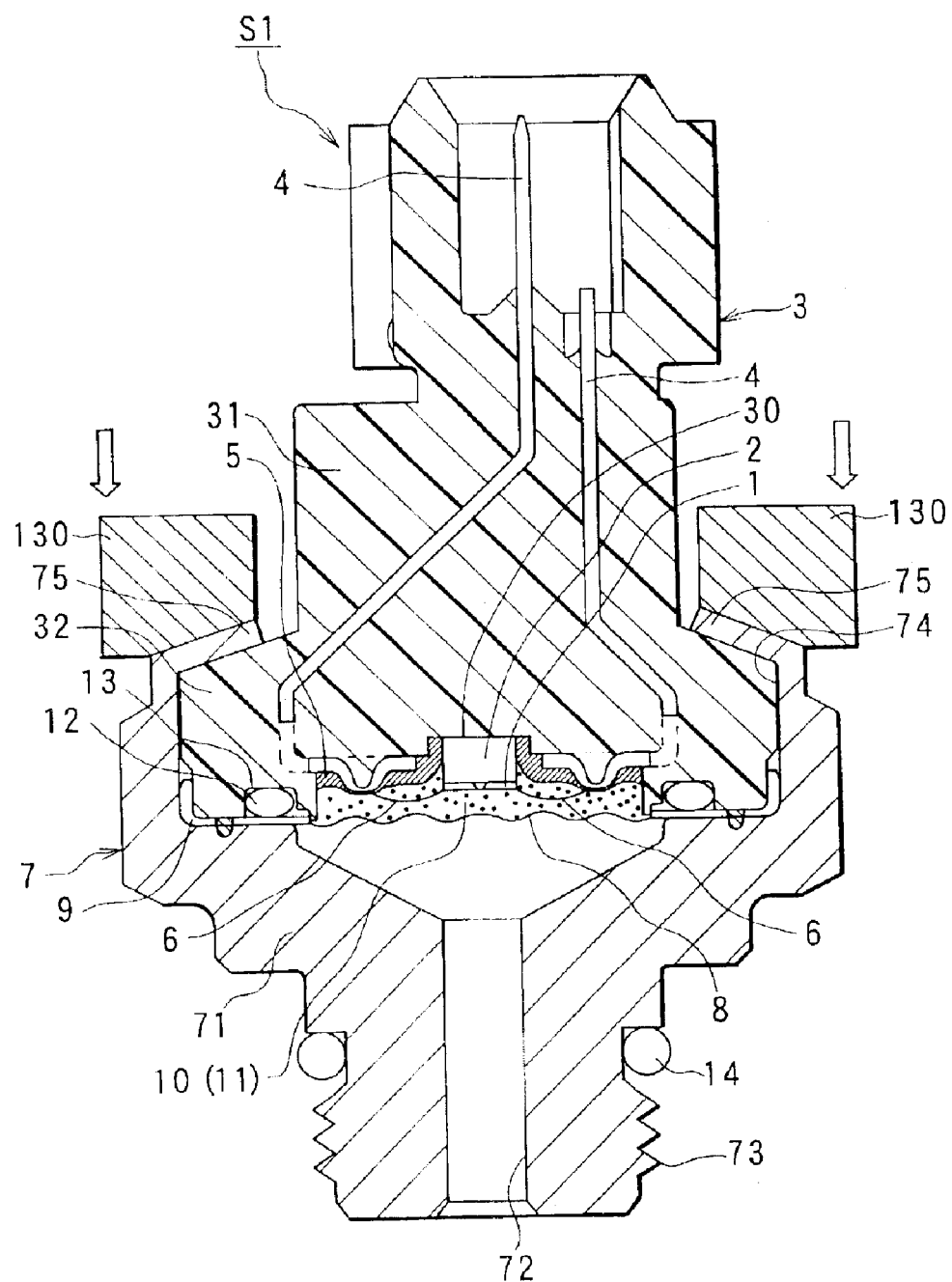
FIG. 4 is a cross-sectional view of the pressure sensor in the second stage of the crimping process.
Figure 6:
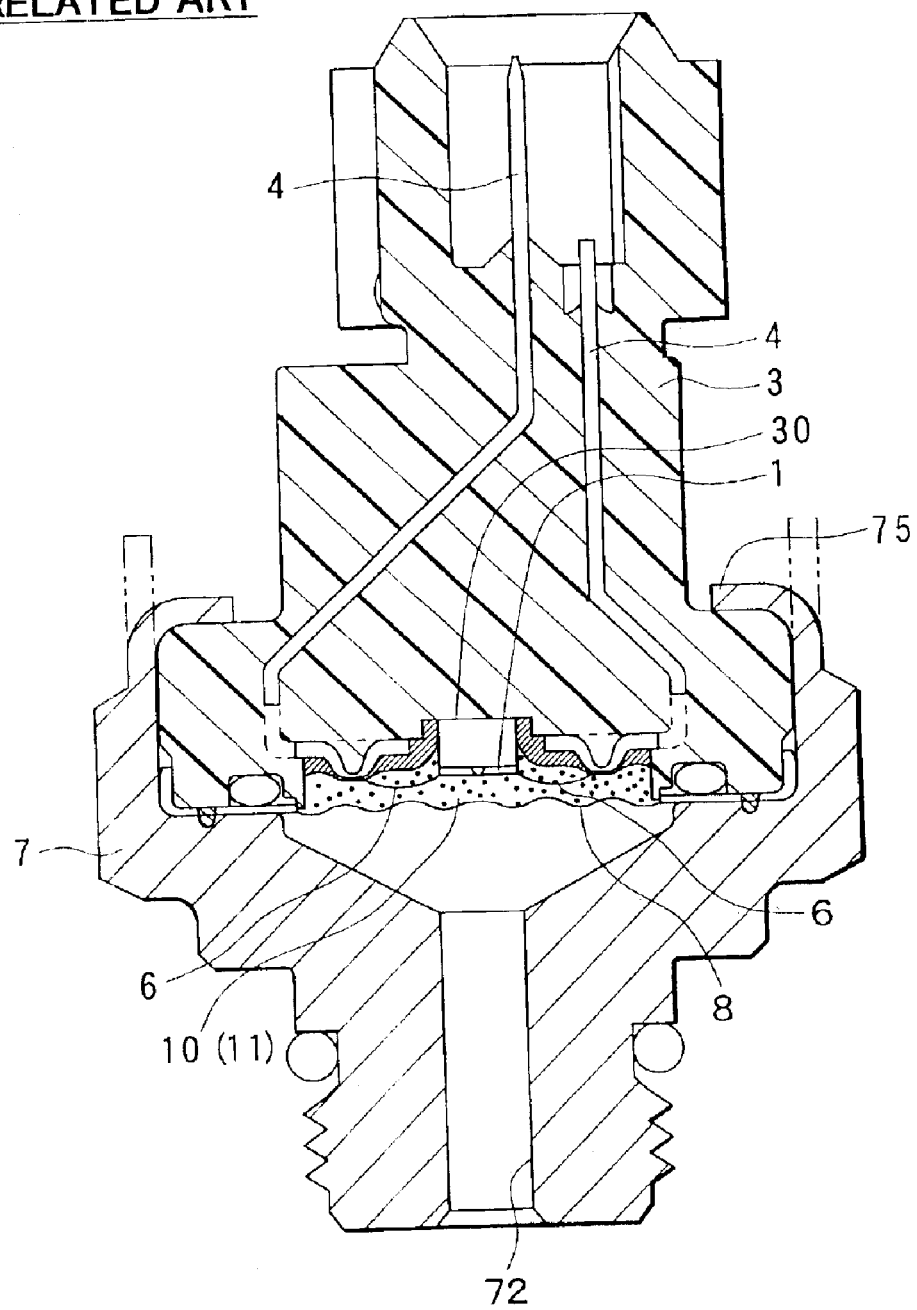
FIG. 6 is a cross-sectional view of a pressure chamber according to a related art.

In the first stage of the crimping process, first and second pressing member of a die 120 are moved vertically as indicated with arrows in FIG. 3 and the rim 75 is bent inwardly. In the second stage of the crimping process, the sensor device S1 is set in the crimping machine 110 having a die 130 in a different shape from the die 120 shown in FIG. 4. The die 130 is formed in a shape so that it alters the rim 75 in the completed shape of the crimping. First and second pressing member of the die 130 are moved downwardly as indicated with arrows in FIG. 4 to press the rim 75 down against the surface of the protruding portion 32.

When the crimping force is continuously applied, the cubic capacity of the chamber 10 decreases, therefore, the oil pressure in the chamber 10 increases. The output voltage Vout detected by the sensing element 1 varies with the oil pressure. The crimping machine 110 monitors the output voltage Vout and controls the crimping force based on the output voltage Vout. When the oil pressure in the chamber 10 reaches a target level, the crimping machine 110 stops the application of the crimping force.

Figure 5A:
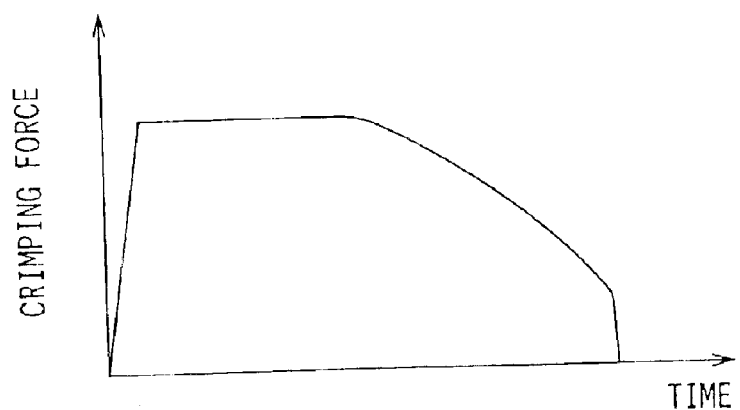
FIG. 5A is a graph showing a crimping force versus time.
Figure 5B:
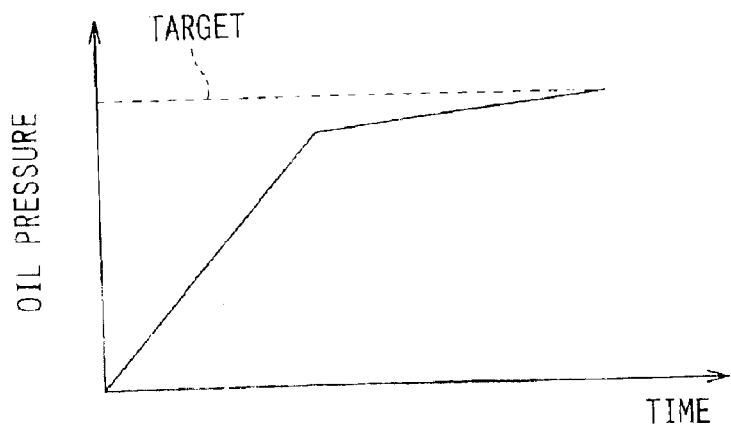
FIG. 5B is a graph showing an internal pressure of a sensing chamber versus time.

The crimping force and the oil pressure in the chamber 10 vary with time, respectively, as shown in FIGS. 5A and 5B. A large crimping force is applied so that the oil pressure in the chamber 10 immediately reaches the target level, for instance 0.1 kg/cm$^2$. When the oil pressure becomes close to the target level, the crimping force is gradually reduced so that an increasing speed of the oil pressure in the chamber slows down. Therefore, the oil pressure in the chamber 10 is precisely set to the target level. When the crimping process is completed, the manufacturing process of the sensing device S1 is completed.

The oil pressure in the chamber 10 is monitored during the crimping process to control the crimping force. Therefore, the oil pressure in the chamber 10 is precisely set to the target level. This reduces variations in the output voltage Vout due to variations in the oil pressure. That is, a highly reliable pressure sensing device is produced by the manufacturing method of the present invention.

The present invention should not be limited to the embodiment previously discussed and shown in the figures, but may be implemented in various ways without departing from the spirit of the invention. For example, the present invention can be applied to any sensing device an internal pressure of the sensing chamber is affected by a crimping force other than pressure sensing devices, such as the device S1.

What is claimed is:

1. A method for manufacturing a sensor device having a sensing chamber defined by a first case and a second case, one of which is crimped to the other, and a sensing portion in the sensing chamber, wherein an internal pressure of the sensing chamber is affected by a crimping force applied to the case crimped to the other, comprising:

arranging the sensing portion in a well formed in the first case;

introducing a pressure transmission medium in the well;

fitting the first case and the second case together;

applying the crimping force to one of the first and the second cases for crimping the one of the first and the second cases to the other of the first and the second cases;

monitor the internal pressure of the sensing chamber by monitoring an output signal of the sensing portion during the application of the crimping force; and controlling the crimping force based on the monitored output signal to adjust the internal pressure of the sensing chamber to a predetermined level.

2. The method according to claim 1, wherein:

the sensing chamber is defined by the well and a metal diaphragm provided between the first and the second cases; and the sensing portion is arranged in the sensing chamber.

3. The method according to clam 1, wherein:

the sensing chamber contains a pressure transmission medium;

the pressure transmission medium includes oil;

the sensing portion includes a pressure sensor; and the pressure sensor detects a pressure of the oil that varies according to the crimping force.

4. The method according to claim 3, further comprising:

generating an output signal associated with the sensing portion and the pressure of the oil, the output signal capable of being coupled to an external circuit;

controlling the crimping force using the output signal; and applying the crimping force until the pressure of the oil reaches a target level.

5. The method according to claim 4, wherein:

the external circuit is located in a crimping machine provided for crimping one of the first and the second cases to the other thereof; and the crimping force is applied by the crimping machine.

6. A method for manufacturing a sensor device having a sensing chamber defined by a first case and a second case, one of the first case and the second case crimped to the other of the first case and the second case, and a sensing portion in the sensing chamber, wherein an internal pressure of the sensing chamber is affected by a crimping force applied to the one of the first case and the second case, the method comprising:

arranging the sensing portion in a well formed in the first case;

introducing a pressure transmission medium into the well;

fitting the first case and the second case together;

applying the crimping force to the one of the first and the second cases for crimping the one of the first and the second cases to the other thereof;

monitoring a pressure associated with the pressure transmission medium during the application of the crimping force, the pressure varying according to the crimping force; and controlling the crimping force based on the monitored pressure.

7. The method according to claim 6, wherein:

the sensing chamber is defined by the well and a metal diaphragm provided between the first and the second cases; and the sensing portion is arranged in the sensing chamber.

8. The method according to claim 6, wherein:

the pressure transmission medium includes oil;

the sensing portion includes a pressure sensor; and the pressure sensor detects a pressure associated with the oil.

9. The method according to claim 6, further comprising:

generating an output signal associated with the sensing portion, the output signal capable of being coupled to an external circuit;

controlling the crimping force using the output signal; and applying the crimping force until the pressure of the pressure transmission medium reaches a target level.

10. The method according to claim 9, wherein:

the external circuit is capable of being located in a crimping machine provided for crimping one of the first and the second cases to the other; and the crimping force is applied by the crimping machine.

11. The method according to claim 6, wherein the first case and the second case are fitted together under vacuum.

* * * * *